(12) United States Patent
Salmela et al.

(10) Patent No.: US 6,516,193 B1
(45) Date of Patent: Feb. 4, 2003

(54) LOCALIZED SPECIAL SERVICES IN A MOBILE COMMUNICATIONS SYSTEM

(75) Inventors: Seija Salmela, Masala (FI); Markku Tuohino, Espoo (FI); Sirpa Vuoristo, Vantaa (FI); Tommi Kokkola, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/331,765

(22) PCT Filed: Jan. 2, 1998

(86) PCT No.: PCT/FI98/00004
§ 371 (c)(1),
(2), (4) Date: Jun. 25, 1999

(87) PCT Pub. No.: WO98/30056
PCT Pub. Date: Jul. 9, 1998

(30) Foreign Application Priority Data

Jan. 3, 1997 (FI) .................................................. 970034
Jan. 3, 1997 (FI) .................................................. 970035
Sep. 5, 1997 (FI) .................................................. 973615

(51) Int. Cl.$^7$ .................................................. H04Q 7/38
(52) U.S. Cl. ................... 455/432; 455/435; 455/458
(58) Field of Search ............................. 455/432, 433, 455/434, 435, 436, 450, 452, 445, 458

(56) References Cited

U.S. PATENT DOCUMENTS 5,260,943 A * 11/1993 Comroe et al. ............. 455/437
5,327,575 A * 7/1994 Menich et al. .............. 455/437

FOREIGN PATENT DOCUMENTS

| EP | 0 505 105 | 9/1992 |
| EP | 0 505 106 | 9/1992 |
| EP | 0 641 137 | 3/1995 |
| WO | 96/34500 | 1/1997 |
| WO | 97/03531 | 1/1997 |

OTHER PUBLICATIONS

Patent Abstract of Japan, vol. 15, No. 175, E–1063 JP 3–40527 A ( NEC CORP), Feb. 21, 1991.

* cited by examiner

Primary Examiner—Thanh Cong Le
(74) Attorney, Agent, or Firm—Pillsbury Winthrop LLP

(57) ABSTRACT

A method and arrangement for controlling the local operation of a mobile station are characterized in that a mobile station specific group of special cells is formed from selected network cells. The information on a group of special cells is transmitted to the mobile station via a radio path and the operation of the mobile station is controlled on the basis of the group of special cells.

30 Claims, 3 Drawing Sheets

LOCALIZED SPECIAL SERVICES IN A MOBILE COMMUNICATIONS SYSTEM

This application is the national phase of international application PCT/FI98/00004 filed Jan. 2, 1998 which designated the U.S.

BACKGROUND OF THE INVENTION

The invention relates to a method and arrangement for controlling the local operation of a mobile station. A mechanism for restricting connection of a mobile station to a cell will be disclosed as one embodiment of controlling the local operation. The invention also relates to a mobile station, data base, subscriber register, location updating method and handover method.

In cellular mobile communications systems, a mobile station may roam freely within the area of the mobile communications network and connect to the base transceiver station signal received best at a given time. Usually, all base transceiver stations provide substantially similar services for the mobile stations in a network. Some base transceiver stations can, however, be defined to provide a certain special service for all mobile stations of the network, e.g. call charges below the normal tariff. The base transceiver station broadcasts a message on such a special service on its broadcast control channel (BCCH), whereby mobile subscribers in the area note that they are within a special service area of the network and may take advantage of this service.

FIG. 1 shows a simplified block diagram of the structure of the pan-European GSM system. The mobile station MS is connected via a radio path to a base transceiver station BTS; in the case shown in FIG. 1 to the base transceiver station BTS7. An idle mobile station MS receives transmission from the base transceiver station selected by it. A base station subsystem BSS comprises a base station controller BSC and base transceiver stations BTS under its control. Usually, there are several base station controllers BSC under a mobile services switching centre MSC. The mobile services switching centre MSC is connected to other mobile services switching centres, a gateway mobile services switching centre GMSC and possibly to an intelligent network IN. The GSM network is connected to other networks through the gateway mobile services switching centre GMSC, such as the public switched telephone network PSTN, another mobile communications network PLMN, ISDN network or intelligent network IN.

The subscriber data of the mobile station MS are stored permanently in a home location register HLR of the system, and temporarily in the visitor location register VLR in the area of which the mobile station is located at a given time. The location information of the mobile station MS is stored in the visitor location register VLR with an accuracy of a location area LA. The geographical area controlled by the visitor location register is divided into one or more location areas LA, within each of which the MS may roam freely without notifying the VLR. Within each location area there may be one or more base transceiver stations BTS in operation.

Base transceiver stations BTS continuously broadcast information on themselves and their environment on their broadcast control channel, e.g. the cell identity CI, information on neighbouring cells and the location area identifier LAI. On the basis of the LAI, the mobile station MS receiving broadcast transmission from the base transceiver station BTS knows in which location area LA it is at a given time. If the mobile station MS notices, on changing the base transceiver station BTS, that the location area identifier LAI of the base transceiver station has changed, it sends a request for location updating to the network. The location area of the mobile station MS is updated to the visitor location register VLR in the area of which the mobile station is at a given time. Information on the VLR covering the area where the MS is located is transmitted to the home location register HLR.

The mobile station MS continuously measures signals of the base transceiver stations BTS located nearest to the cell within which the mobile station is located e.g. to determine the base transceiver station providing the best signal and to be prepared for a possible handover. The mobile station identifies the neighbouring cells it is to monitor on the basis of the information on neighbouring cells transmitted by each base transceiver station on its broadcast control channel. For example, in the GSM system the mobile station MS can simultaneously measure the signal level and/or quality of a maximum of 32 other base transceiver stations in addition to the serving base transceiver station. When roaming within the mobile communications network, the mobile station MS usually connects to receive the base transceiver station BTS having the strongest signal. Thus an effort is made to set up a call terminating to a mobile station MS or a call originating therefrom primarily through this base transceiver station BTS.

In mobile communications systems, location information on the MS is needed for routing incoming calls and for other network services. FIG. 2 of the attached drawings shows by way of example location updating triggered by the mobile station MS as a signalling chart. The mobile station MS requests a signalling channel from the base transceiver station BTS for location updating and sends a request for location updating (message 21) on the assigned channel. The request is transmitted to the mobile services switching centre MSC. The mobile services switching centre MSC forwards the request for location updating to the visitor location register VLR in message 22. In step 23, the authenticity of the subscriber is verified (known as authentication) e.g. to control the access to the network and to prevent abuse. In authentication, information stored in the network is compared with information stored in the mobile station MS. After a successful authentication the new visitor location register VLR transmits a message 24 on location updating to the home location register HLR of the mobile station. The home location register HLR acknowledges location updating by sending the necessary mobile subscriber data (message 25) to the visitor location register VLR. In step 27, information on the protection algorithm that will be used is transmitted to the mobile station MS. The visitor location register VLR informs of completion of location updating in message 28. The mobile services switching centre MSC forwards this message to the mobile station MS in message 29. Messages 28 and 29 also include the new temporary mobile subscriber identity TMSI assigned to the mobile station MS by the visitor location register VLR. After completion of location updating, the signalling channel used is released. In addition to the location updating signalling described above, the visitor location register VLR, if necessary, also inquires the identity of the mobile station and requests authentication keys of the mobile station and other necessary subscriber data either from the previous visitor location register of the mobile station or from the home location register HLR.

A problem associated with the above-mentioned embodiment for providing special services in a network is that both base transceiver stations providing special services and base transceiver stations providing standard services have to serve all the mobile stations entitled to use the network substantially in the same way. Hence it is not possible to provide tailored special services to which other mobile stations are not entitled for individual mobile stations or for a mobile station group. A problem associated with prior art mechanisms of the embodiment in which controlling of the local operation comprises restricting connection to a cell is that the restriction covers the whole network, and thus the mechanisms are not suitable for locally restricting the use of a mobile station.

BRIEF DESCRIPTION OF THE INVENTION

An object of this invention is to create and utilize subscriber-specific or subscriber-group-specific localised service areas. Localised service areas allow to provide some locally tailored special service, e.g. call charges below the normal tariff. Alternatively, or additionally, connection of a mobile station to a network can be restricted locally.

This new kind of controlling of local operation of mobile stations is achieved with methods and apparatuses, which are characterized by what is disclosed in the appended claims. According to the invention, a mobile-station specific list of special cells is drawn up of selected network cells, and the operation of the mobile station is controlled on the basis of said list of special cells, e.g. connection of a mobile station to a network is restricted.

The invention also relates to an arrangement comprising means for processing location updating. According to the invention, the arrangement is characterized in that it comprises a list of special cells drawn up for a mobile station, means for processing said list of special cells, and means for controlling the operation of the mobile station on the basis of said list.

The invention further relates to a data base, which, according to the invention, is characterized in that it comprises a list of special cells drawn up for a mobile station, the list comprising information on localised service cells of the mobile station. This data base can be used for providing locally tailored services or for locally restricting connection of a mobile station to a network.

Furthermore, the invention relates to a mobile station which is arranged to send a request for location updating. According to the invention, the mobile station is characterized in that it comprises means for storing a list of special cells and means for utilizing the stored list of special cells. Said utilization may comprise e.g. a message provided for the user that the mobile station is within a localised service area. Utilization may also mean that the mobile station is arranged to connect only to the cells on the list of special cells.

The invention further relates to a location updating method, in which a request for location updating is sent to the network from a mobile station in order to update location information of the mobile station. The request for location updating is transmitted to a visitor location register in order to update the location area of the mobile station, and a message on location updating is sent from the visitor location register to a home location register in order to update the location information of the mobile station. Location updating is carried out in the home location register and an acknowledgement message on completion of location updating is sent by the home location register to the visitor location register, and location updating is carried out in the visitor location register, and a message on completion of location updating is sent to the mobile station. According to the invention, the location updating method is characterized in that a service request is sent from the visitor location register in order to ask for information on special cells of the mobile station, and this information on special cells is sent to the mobile station.

Furthermore, the invention relates to a handover method, characterized in that when a mobile station roams from one cell to another, the old cell and/or the new cell being a special cell, information on changes is transmitted to the mobile station already in the handover command.

The invention is based on the idea that a special service area is defined for a mobile subscriber by drawing up a list of certain network cells, i.e. special cells, for the subscriber. The list can be utilized in a mobile station or in a fixed network. In the present application such a special service area is referred to as LSA (Localised Service Area).

In the method of the invention the list of special cells is stored for the mobile subscriber in a data base, preferably in the home location register or in the data base of the intelligent network. The list contains network cells defined e.g. as preferred cells, in which some special service, e.g. call charges below the normal tariff, is provided for the mobile station in question. According to one embodiment, connection of a mobile station to a network can be totally restricted outside preferred cells. Decisions on providing a special service and/or restricting connection to a cell can be made in a mobile station or in a fixed network or in both of these.

In usual cases only a few special cells are defined for each mobile station, and hence this list can be stored e.g. in the SIM card of the mobile station. In theory, however, a mobile subscriber could have dozens or even hundreds of special cells, and thus instead of the SIM card or in addition to it the list of special cells could be maintained in connection with location updatings of the mobile station. If changes are noticed in the information on the special cells of the mobile station, e.g. when the mobile station sends a request for location updating to the network, in addition to the location updating method of the prior art, the list of special cells stored, or the part of the list of special cells related to the location area, is fetched from the data base for the mobile subscriber performing the location updating, and the information on special cells that was fetched is transmitted to the mobile station e.g. as an USSD service, short message or as attached to the location updating signalling. One possible solution for this is the method known as SIM Data Download, defined in the GSM recommendation 11.14 of ETSI. The mobile station stores the updated list in its memory. When roaming within the mobile communications network, the mobile station can compare the identifier received from the base transceiver station with the stored list. If the identifier of the base transceiver station corresponds (or does not correspond) to the identifier on the stored list, the mobile station can inform the user of this, e.g. with a tone or a text on the display of the mobile station. According to one preferred embodiment of the invention, the mobile station does not need to compare the identifiers itself to find out whether changes have occurred in the special cell situation, but it may receive information from the base transceiver station during the call that the special cell situation is changing, or has changed. In this case, the mobile station can react to the change in the information on special cells on the basis of some criterion set to the mobile station. For example, it may cut off a call which cannot be maintained in the LSA area.

The methods and systems of the invention have the advantage that in a public mobile communications system, special services reserved only for certain subscribers can be arranged to certain cells, e.g. call charges below the normal tariff, or other supplementary services which are not supported in the areas of all the base transceiver stations.

One further advantage of the inventive solution is that it is based on the standard cellular structure of a mobile communications network.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
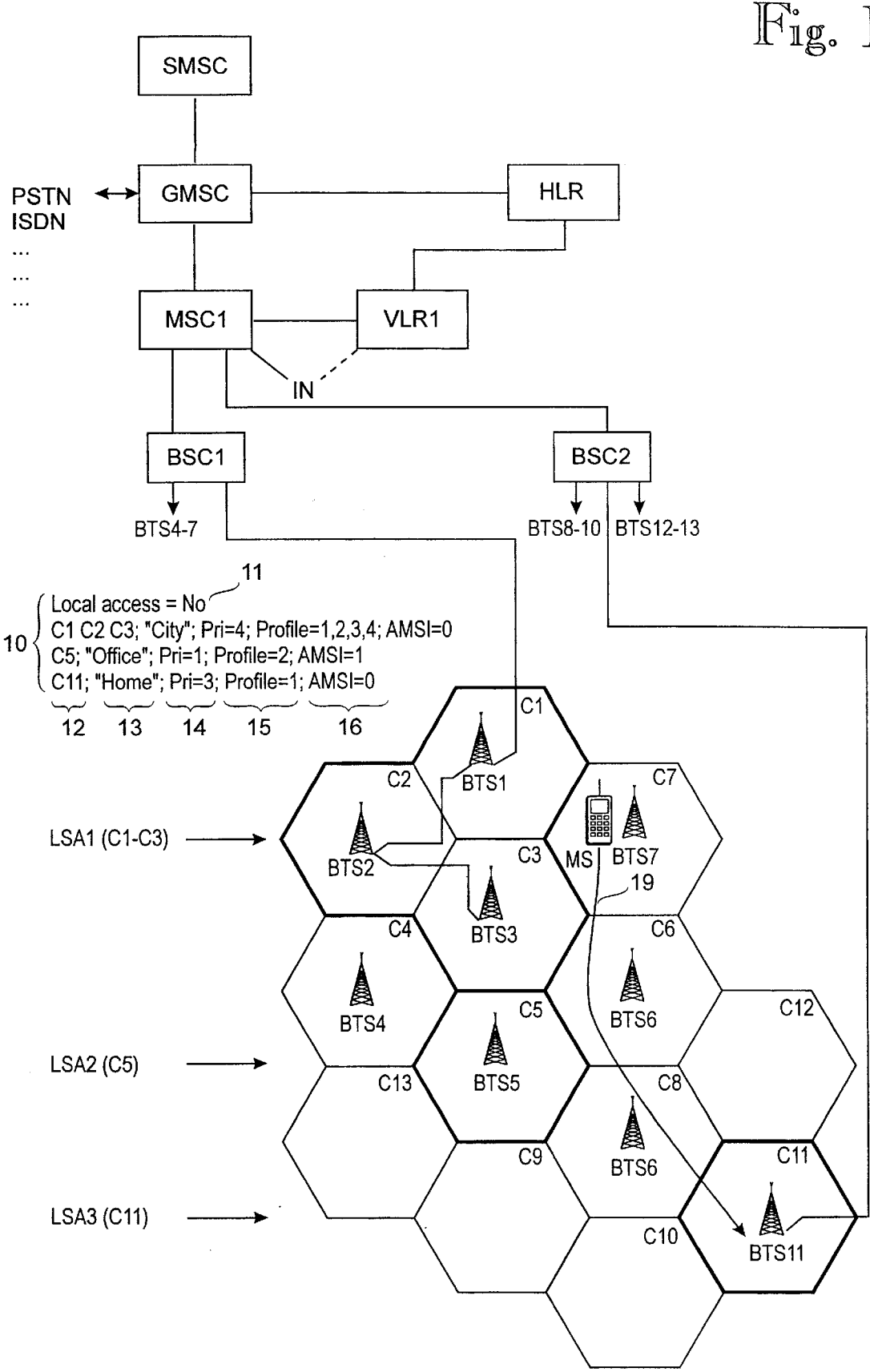
FIG. 1 shows the parts of the mobile network system that are essential for understanding the invention.

The invention can be applied to any cellular mobile communications system. In the following, the invention will be described in greater detail by way of example mainly with reference to the pan-European digital GSM system. FIG. 1 illustrates a simplified structure of the GSM network described above. With respect to a more detailed description of the GSM system, reference is made to GSM recommendations and *The GSM System for Mobile Communications*, M. Mouly & M. Pautet, Palaiseau, France, 1992, ISBN: 2-9507190-0-7.

FIG. 1 illustrates three localised service areas for a mobile station MS, of which LSA1 comprises cells C1–C3, LSA2 comprises cell CS and LSA3 comprises cell C11. (For the sake of clarity it is assumed in FIG. 1 that each cell C11–C13 is supported by a base transceiver station BTS1–BTS13 having the corresponding number, although this is not necessary; furthermore, not every base station is illustrated separately.) Reference numeral 10 illustrates a possible embodiment of the list of special cells of the mobile station MS. Elements 11–16 on the list will be dealt with in greater detail later on.

Figure 2:
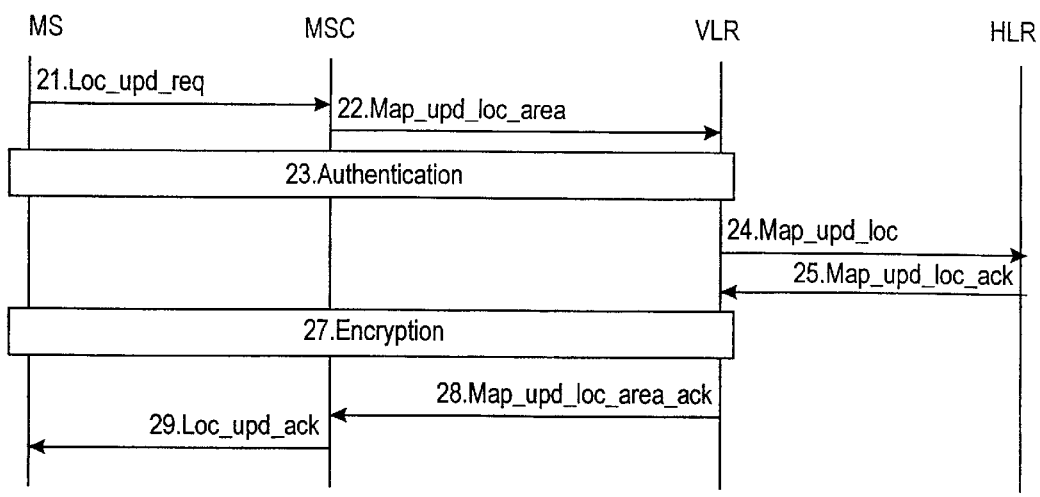
FIG. 2 shows location updating according to the prior art as a signalling chart.

In the following, the invention will be described in greater detail with reference to FIGS. 3A, 3B, 4A, and 4B, which illustrate location updating according to the different embodiments of the invention as a signalling chart. Signalling in FIGS. 3A, 3B, 4A and 4B partially corresponds to the location updating signalling explained earlier in connection with FIG. 2. These prior art steps are indicated in the accompanying drawings with the same numbers as in FIG. 2. In addition to the signalling illustrated in the figures, location updating comprises the standard functionality of location updating.

In the present application, a special cell refers to a cell of normal network planning, in which cell some special service can be offered to the mobile station or outside which connection of a mobile station to a cell can be barred. The special cell may be e.g. a macrocell, microcell or picocell. The operator selects those network cells that will be defined as a certain mobile subscriber's special cells, and hence they will be included in the list of special cells to be drawn up for the mobile subscriber.

Figure 3A:
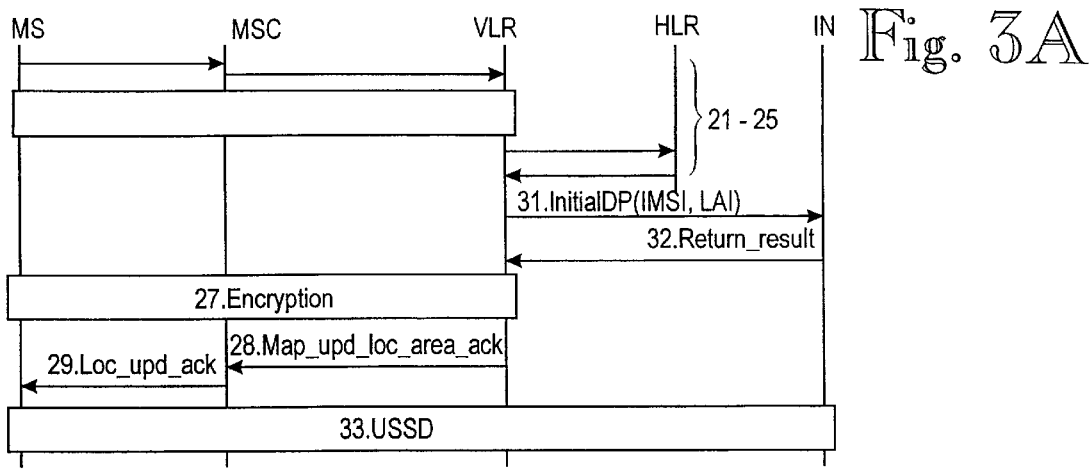
FIG. 3A shows location updating according to a first embodiment of the invention as a signalling chart, the lists of special cells of the invention being located in a data base of the intelligent network.

FIG. 3A illustrates location updating according to a first embodiment of the invention as a signalling chart. In the first embodiment of the invention, lists of special cells are stored in a data base of the intelligent network. Steps 21–25 have been described in connection with FIG. 2. According to the invention, the visitor location register VLR sends a service invocation message 31 to the intelligent network IN; an identifier identifying the mobile station, e.g. IMSI, and a location area identifier LAI are attached to the message. The intelligent network service checks on the basis of the mobile station identifier whether special cells have been set to the list of special cells for the mobile station. Information on special cells to be transmitted to the mobile station MS is fetched from the list of special cells of the mobile station, e.g. special cells in the new location area of the mobile station are fetched on the basis of the location area identifier LAI. In message 32, the information achieved as a result is sent to the unit that triggered the service, i.e. in this case to the visitor location register VLR, e.g. as a list of the mobile station identifier IMSI and special cell identifiers C11, C12, C13, . . . (In FIG. 3A, the message 32 is shown as Return result. Another suitable message is Continue.) The service control point of the intelligent network IN sends this information on special cells to the mobile station MS in a USSD message 33 at an appropriate point of the location updating process, or after location updating has been completed, as illustrated in FIG. 3A. The USSD service known per se allows data transmission which is transparent to the rest of the network between the mobile station MS and the unit defined by the mobile communications network operator. The mobile communications network may at any time send a USSD message to a mobile station MS registered with the network in order to transmit information to the subscriber. With respect to a more detailed description of the USSD, reference is made to the following GSM recommendations: GSM 02.90: European digital cellular telecommunications system (Phase 2); Stage 1 description of Unstructured Supplementary Service Data (USSD), GSM 03.90: Digital cellular telecommunications system (Phase 2); Unstructured Supplementary Service Data (USSD)—Stage 2, and GSM 04.90: European digital cellular telecommunications system (Phase 2); Unstructured Supplementary Service Data (USSD)—Stage 3. The USSD service requires that all parts of the mobile communications system be at least systems of phase 2.

The location updating continues according to the prior art in such a manner that information on the protection algorithm that will be used is transmitted to the mobile station MS in step 27, and a notice of completion of location updating in messages 28 and 29.

In other embodiments of the invention the information on special cells can be transmitted to the mobile station MS e.g. as a short message or in another appropriate form.

Figure 3B:
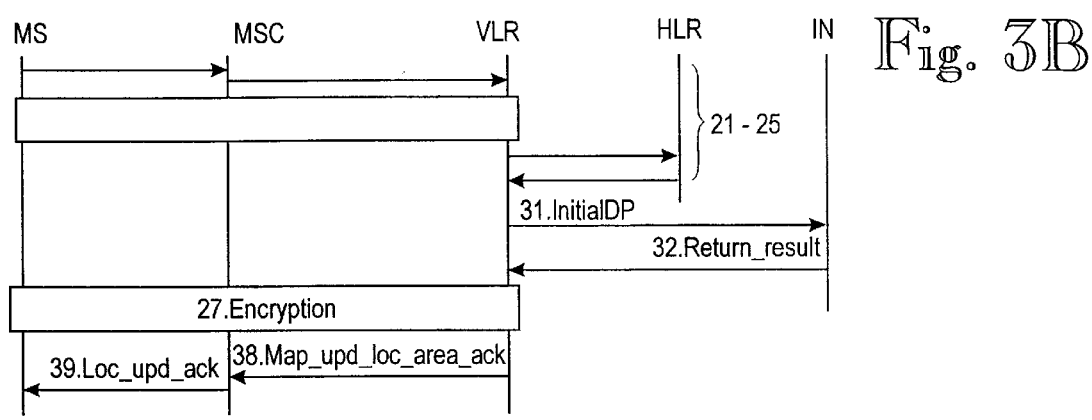
FIG. 3B shows location updating as a signalling chart according to a second embodiment of the invention, the lists of special cells of the invention being located in a data base of the intelligent network.

FIG. 3B illustrates location updating according to a second embodiment of the invention as a signalling chart. In the second embodiment of the invention, lists of special cells are stored in the data base of the intelligent network as in the case of the first embodiment described above. Steps 21–25 have been described in connection with FIG. 2. According to the invention, the visitor location register VLR sends a service invocation message 31 to the intelligent network IN according to the present invention, as was explained in connection with FIG. 3A. The intelligent network checks whether special cells have been stored in the list of special cells for the mobile station, and fetches the information on special cells to be transmitted to the mobile station MS from the list. The information on special cells that was fetched is sent to the visitor location register VLR in message 32. In step 27, location updating is continued according to the prior art by transmitting information to the mobile station MS on the protection algorithm that will be used. According to the second embodiment of the invention, the visitor location register VLR informs the mobile switching centre MSC of completion of location updating in message 38, and also sends the information on special cells that was fetched for the mobile station. The mobile switching centre MSC transmits this notice as well as the information on special cells attached to the notice to the mobile station MS in message 39. Messages 38 and 39 correspond to the messages 28 and 29 described in connection with FIG. 2, except for that the information on special cells fetched from the list of special cells by the intelligent network has been added to the manufacturer-specific field in messages 38 and 39.

In location updatings within the area of the visitor location register VLR the signalling of messages 24 and 25 (shown in FIGS. 3A and 3B) from the visitor location register VLR to the home location register HLR is usually omitted. Otherwise location updating of the first and second embodiments of the invention is carried out as was explained above.

In other embodiments of the invention the service invocation message to the intelligent network IN can also be sent by another unit of the mobile communications system, e.g. by the home location register HLR. It is possible to add some special subscriber identifier to the mobile subscriber data in the home location register HLR, and thus also to the visitor location register VLR to indicate that the subscriber has a list of special cells. In this case, the message for triggering the intelligent network service is sent only when the above-mentioned identifier indicates that the mobile station carrying out location updating is a special subscriber for whom a list of special cells has been stored in the intelligent network. By means of the solution based on the intelligent network the functionality according to the invention can be implemented without interfering with the standard functionality of the network. Furthermore, information management will be flexible.

Figure 4A:
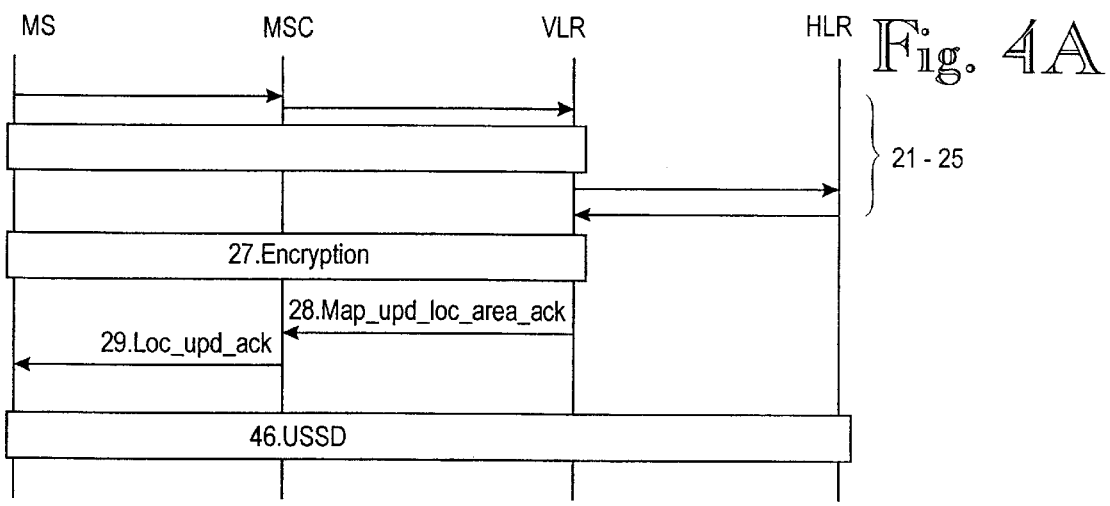
FIG. 4A shows location updating as a signalling chart according to a third embodiment of the invention, the lists of special cells of the invention being located in the home location register HLR.

FIG. 4A shows location updating of a third embodiment of the invention as a signalling chart. In the third embodiment of the invention, lists of special cells are stored in the home location register HLR, e.g. in connection with other subscriber data. Steps 21–25 have been described in connection with FIG. 2. According to the invention, the home location register HLR checks whether special cells have been defined for the mobile station carrying out location updating in the list of special cells. For example, information on special cells located in the area controlled by the visitor location register VLR is fetched from the list of special cells stored for the mobile station. The home location register HLR sends this information on special cells to the mobile station MS in a USSD message 46, and the mobile station MS stores the information in its memory. Location updating continues according to the prior art with messages on protection algorithm and completion of location updating in step 27 (messages 28 and 29).

In the other embodiments of the invention the home location register HLR may send the information on special cells to the mobile station MS at any appropriate point of location updating after receiving the message on location updating from the visitor location register VLR or after location updating has been completed. The information on special cells can be sent to the mobile station MS e.g. in the manner described in connection with the first embodiment of the invention as a USSD message, short message or in another appropriate form. It is also possible to send only the information on special cells located in the new location area to the mobile station MS. This can be carried out e.g. in such a manner that the home location register HLR sends the visitor location register VLR information on special cells relating to the area controlled by the VLR in connection with location updating. During the location updating within the area of the visitor location register it is thus possible to fetch information on special cells located in the new location area from the list of special cells stored in the visitor location register VLR, and to send this information to the mobile station e.g. in a USSD message.

Figure 4B:
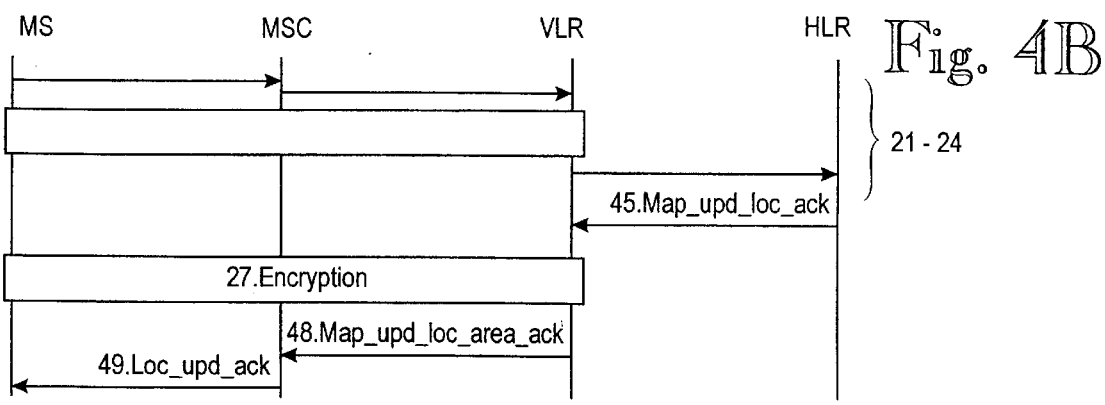
FIG. 4B shows location updating as a signalling chart according to a fourth embodiment of the invention, the lists of special cells of the invention being located in the home location register HLR.

FIG. 4B illustrates location updating of a fourth embodiment of the invention as a signalling chart. In the fourth embodiment of the invention, lists of special cells are stored in the home location register HLR as in the case of the third embodiment described above. Steps 21–24 have been described in connection with FIG. 2. The home location register HLR triggers verification of the list of special cells with respect to the mobile station in question and fetches information on special cells from the list to be sent to the mobile station MS, e.g. information on special cells located in the area monitored by the visitor location register VLR. The home location register HLR sends acknowledgement of location updating, necessary mobile subscriber data and information on special cells fetched for the mobile station to the visitor location register VLR in message 45. Message 45 corresponds to the message 25 in FIG. 2, with which the HLR acknowledges location updating and sends the subscriber data to the visitor location register VLR, except for that in message 45 the information on special cells fetched from the list of special cells has been added to the manufacturer-specific field in the acknowledgement message. In step 27, information on the protection algorithm that will be used is transmitted to the mobile station MS according to the prior art. According to the fourth embodiment of the present invention, the visitor location register VLR informs the mobile switching centre MSC of completion of location updating in message 48, and at the same time sends the information on special cells that was fetched for the mobile station. The mobile switching centre MSC transmits this message and the information on special cells attached to it to the mobile station MS in message 49. Messages 48 and 49 correspond to the messages 28 and 29 described in connection with FIG. 2, except for that in messages 48 and 49 the information on special cells fetched from the list on special cells has been added to the manufacturer-specific field.

In the other embodiments of the invention the visitor location register VLR may store the information on special cells sent by the home location register HLR in message 45 in its data base e.g. in connection with the mobile subscriber data. During the location updating within the area of the visitor location register VLR it is thus possible to fetch e.g. information on special cells located in the new location area, and to send this information to the mobile station MS e.g. in messages 48 and 49 as was explained above in connection with the fourth embodiment. In this case, information on special cells is sent from the home location register HLR only during location updating between visitor location registers.

The list of special cells of the invention, which is stored in the data base, is mobile-subscriber-specific, but preferred cells can be defined as common to e.g. certain subscribers or a certain subscriber group. Thus in the preferred cells meant for these subscribers it is possible to provide services dependent on the location of the subscriber, e.g. office services such as call charges below the normal tariff and/or other tailored services. The list of special cells is stored for those mobile stations to which the inventive functionality is to be applied.

The list 10 of special cells of the invention is drawn up of identifiers determining an individual cell e.g. by storing a cell identifier 12 in the list. The cell identifier may include the CI (Cell Identity) and/or the location area identifier LAI of the area of the cell in question, etc. Cell-specific information can also be stored in the list of special cells, e.g. text 13 to be displayed to the user and describing the cell in question, or the service provided. By means of the location area identifier LAI stored, in addition to the cell identifier CI, it is possible to fetch cells in the current location area of the mobile station from the list 10 of special cells and to send only these cell identifiers CI with their extra information to the mobile station. With the location area identifier LAI it is also possible to fetch from the list all the special cells in the current visitor location register VLR of the mobile station. An optional field 11 indicates whether the mobility of the mobile station is restricted only to the special cells shown on the list 10. Other useful information elements include the priority field 14, by means of which different LSA areas can be prioritized with respect to one another. The profile field 13 determines the multiple subscriber profile (MSP) corresponding to the LSA area. Notification field 16 (herein referred to as AMSI=Active Mode Support Indication) is related to a preferred embodiment of the invention, in which some LSA areas can be defined as areas that must be reported. This means that the network element (usually the base station controller) deciding on handover is notified of the existence of such areas, regardless of the area where the call originates. According to the alternative shown in FIG. 1 the notification field 16 may receive two different values: an LSA field is reported: never (AMSI=0) or always (AMSI=1). According to another preferred embodiment, if AMSI=3, LSA areas are reported when the mobile station receives the base transceiver stations serving the areas.

The data base of the invention, e.g. a unit of the intelligent network IN or the home location register HLR of the mobile communications network, fetches information on special cells for the mobile station from the list of special cells in a manner defined by the operator. Information retrieval can be arranged to be carried out in such a manner that the following information is fetched from the list: all the special cells of the mobile communications network in question, stored for the mobile station in question; special cells in the area of the current visitor location register VLR; or special cells in the current location area of the mobile station.

A direct connection can be established from the subscriber register of the invention, preferably from the visitor location register VLR, to the intelligent network IN, as indicated by a broken line in FIG. 1. To implement this a service switching point SSP is provided in the subscriber register.

The mobile station MS of the invention receives the list 10 of special cells sent e.g. in a message on location updating, in a USSD message or as a short message. The mobile station MS stores the list it received, and when roaming within the area of the mobile communications network, compares the identifiers on the list with the base transceiver station identifier, e.g. with the cell identifier CI transmitted on the broadcast control channel of the base transceiver station. When the mobile station MS detects that the base transceiver station identifier corresponds to one of the identifiers on the list of special cells, the user will be informed of this e.g. with a tone, an appropriate text on the display of the mobile station or with a combination of these. The text shown on the display of the mobile station may be e.g. a special character defined for the information on special cells, or cell/LSA-specific information stored in the list of special cells. Having received the announcement, the mobile subscriber knows that he is located in a special service area, where he is entitled to a tailored service. The subscriber may thus decide whether he wants to utilize this service provided especially for him. A corresponding announcement may be given when the mobile station leaves the LSA area.

In the following, such embodiments of the invention in which controlling the local operation of a mobile station comprises restricting connection of a mobile station to a cell will be described in greater detail. If there are, according to the list of special cells, forbidden cells among the base transceiver stations having an acceptable signal strength, the mobile station does not connect to receive cells, but selects one of the permitted cells. The operator can also define that the mobile station avoids forbidden cells, but can connect to them, if it cannot otherwise receive network services.

Figure 5:
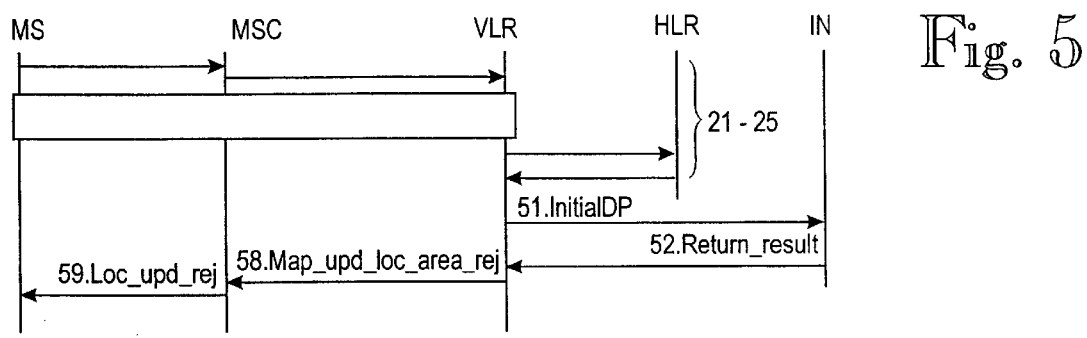
FIG. 5 shows a further location updating method extended according to the invention.

FIG. 5 illustrates location updating of one embodiment of the invention as a signalling chart. In one embodiment of the invention the mobile communications network restricts connection of a mobile station to a cell on the basis of the subscriber-specific list of special cells stored in the intelligent network IN. Steps 21–25 have been described in connection with FIG. 2. According to this embodiment, the visitor location register VLR sends a service invocation message 51 to the intelligent network IN, as was explained in connection with FIG. 3A. The intelligent network checks whether special cells have been stored in the list of special cells for the mobile station MS, and especially whether among the special cells there are cells that are located within the new location area of the mobile station. Restricting a mobile station's mobility may comprise one or both of the following cases: a) the network rejects a location area update if all of the location area is forbidden. In this case, the list of special cells can be simply a location area index, LAI, i.e. all cells in it do not have to be listed separately. B) if the location area comprises at least one permitted cell the location area update is accepted and the mobile station MS itself rejects any forbidden cells in the location area. In the example shown in FIG. 5, the entire location area is forbidden and thus the location area update is rejected. The intelligent network sends the VLR a message 52 for rejecting/interrupting the location area update. If a forbidden cell locating in the new location area is found on the list of special cells, the intelligent network sends a command to discontinue location updating to the visitor location register VLR in message 52. The visitor location register VLR sends a notice to the mobile services switching centre MSC in message 58 that location updating is rejected. The mobile services switching centre MSC forwards this information to the mobile station MS in message 59. If no special cells defined for the new location are found on the list of special cells in the check carried out by the intelligent network, location updating is performed normally, as was explained above in connection with FIG. 2.

In other embodiments of the invention, the mobile communications network can restrict connection of a mobile station to a cell e.g. in connection with the home location register HLR. In one possible embodiment the home location register fetches information on special cells in the area of the visitor location register VLR from the list of special cells of a mobile station in connection with location updating, and sends this information to the visitor location register VLR, which checks whether special cells located in the new location area LAI of the mobile station are found in the information on special cells. If a forbidden cell located in the new location area is found on the list of special cells, a notice according to which location updating cannot be carried out will be sent to the mobile station MS, as was explained earlier. Otherwise, location updating is completed normally according to the prior art.

The list of special cells of the invention, which is stored in the data base, is mobile-subscriber-specific, but forbidden or permitted cells can also be defined as common to e.g. certain subscribers or a certain subscriber group. By means of the concept of special cell it is possible to restrict connection to a certain cell by others than desirable subscribers by defining the cell as forbidden, or by not defining the cell as permitted to the undesirable subscribers list of special cells. The list of special cells is stored for those mobile stations to which the inventive functionality is to be applied.

The data base of the invention, e.g. a unit of the intelligent network IN or the home location register HLR of the mobile communications network, fetches information on special cells for the mobile station from the list of special cells in the manner defined by the operator. Information retrieval can be arranged to be carried out in such a manner that the following information is fetched from the list: all the special cells of the mobile communications network in question, stored for the mobile station in question; special cells in the area of the current visitor location register VLR; or special cells in the current location area of the mobile station.

A direct connection can be established from the subscriber register of the invention, preferably from the visitor location register VLR, to the intelligent network IN, as is indicated by a broken line in FIG. 1. To implement this a service switching point SSP is provided in the subscriber register.

Figure 6:
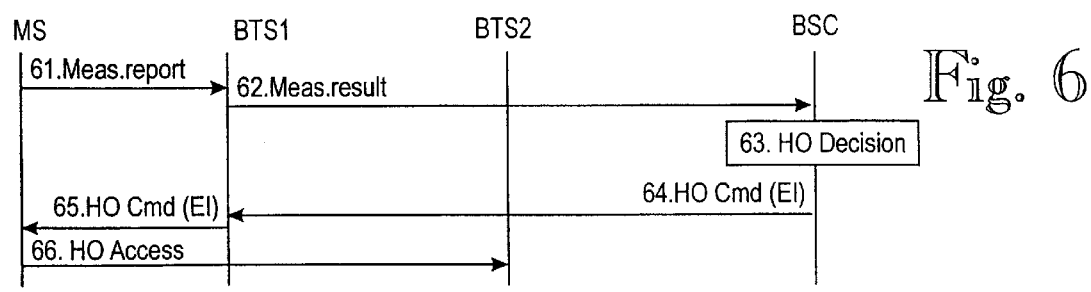
FIG. 6 shows a handover method extended according to the invention.

Referring now to FIG. 6, according to a further embodiment of the invention, the handover method used in the field will be changed as follows. In handover methods of the prior art the mobile station sends measurement information (61) describing the radio connection to its serving base transceiver station BTS1, and the base transceiver station transmits (62) this information to the base station controller BSC after an optional post-production processing. On deciding to change (63) another base transceiver station BTS2 to serve the mobile station, the base station controller BSC sends (64–65) a handover command to the mobile station MS through the first base transceiver station BTS1, whereby the mobile station normally changes over (66) to the channel assigned in the handover command. (In this context, a base station controller refers to a network element which decides on sending the handover command.)

The handover method of the invention utilizes the list 10 of special cells defined for the mobile station. If in the handover in question the old or new cell (or both) of the mobile station is a special cell, extra information EI on this (steps 64–65) is included in or directly associated with the handover command, and the extra information EI is used for controlling the operation of the mobile station. Controlling the operation of the mobile station may mean that the mobile station makes decisions independently, e.g. on the basis of some criterion set to it, and/or it gives a sign to its user so that he can participate in controlling the operation of the mobile station. The extra information EI is e.g. an additional field indicating one of the following things: a) the cell is changing from a special cell to an ordinary cell; b) the cell is changing from one special cell to another; or c) the cell is changing from an ordinary cell to a special cell. Since in the GSM system the base station controller does not store any user-specific information for the handover of the invention, it is necessary to notify the base transceiver station of the fact that special cells have been defined for the mobile station.

There may be several types of extra information EI, depending e.g. on the seriousness of the consequences. A certain type of extra information may indicate that only the call charge changes if the mobile station leaves the special cell area. In this case it is advantageous if a tone is provided for the user to make the user check the display of his mobile telephone on which a text informing of the charge change is shown. The charge change can be indicated either directly or indirectly. A direct indication can be a message shown on the display for a few seconds. A possible indirect indication could be to show the special cell identifier 13 (FIG. 1) in addition to the operator identifier, which is normally on the display. When the call charge goes up, the user perhaps decides that he finishes the call soon, but the call is not cut off automatically. Alternatively, the company owning the mobile station may set a condition that a call originating from the mobile station is not maintained in the area with higher charges, but the call is cut off automatically. Another type of extra information may indicate that the call within a base transceiver station would have to continue as a call between two base transceiver stations, whereby the conventional base transceiver station (i.e. the one that does not serve a special cell area) cannot necessarily maintain the call to which some special service is attached. In this case the mobile station may (e.g. on the basis of a criterion set to it) refuse handover, i.e. it may reject the handover command.

Consequently, the base station controller BSC has to be informed of the fact that the mobile station has special cells. (Usually, the mobile station reports the cells it measures at a given time.) This facility can be supported by defining certain cells as cells that must always be reported to the base station controller, regardless of the area where the call has originated. In FIG. 1 cell C5 is such a cell, forming area LSA2 for the mobile station MS. It is assumed that at the beginning of the call the mobile station MS is in cell C7 and moves during the call to cell C11 along the route shown by line 19. Cell C7 is not yet in the LSA area, thus the base station controller BSC1 does not necessarily have information on the fact that special cells have been defined for the mobile station MS. In this case, however, the list 10 indicates that the information on area LSA2 (including C5) is always transmitted to the base station controller BSC1. Now that the mobile station MS moves within cell C6 towards cell C8, it sends measurement information on cell C6 and its neighbouring cells to its serving base transceiver station BTS1. Since the base station controller BSC1 knows that cell C5 is a special cell for the mobile station MS, the handover algorithm of the BCS1 may favour cell C5 at the expense of cells C6 and C8, i.e. it can tell the mobile station MS to connect to the base transceiver station BTS5, even though the coverage of base transceiver stations BTS6 and BTS8 were better. Information on LSA areas that must be reported can be transmitted from the mobile station or MSC1 to the base station controller BSC1. FIG. 1 illustrates a situation where LSA3 is within the area of a different base station controller BSC2 than LSA1 and LSA2. In the case of inter-BSC handover, information on the list 10 of special cells has to be transmitted to the new base station controller in addition to ordinary subscriber data.

The drawings and the related description are only intended to illustrate the inventive concept. The details of the localised service functionality of the invention may vary within the appended claims. Even though the invention has mainly been described above in connection with the GSM system, it can also be applied to other mobile communications systems, e.g. to CDMA systems. Almost any identifier, by means of which a network cell can be identified sufficiently accurately, can be used as the cell identifier to be stored in the list of special cells of the invention instead of the cell identifier CI; such an identifier could be e.g. cell global identification, which according to the GSM recommendations is a combination of information on the country code, network code, location area and cell identity.

What is claimed is:

1. A method for controlling the local operation of a mobile station, the method comprising:
    the mobile station sending a request for location updating, if the mobile station notes that its location area has changed;
    forming a mobile-station-specific group of localized cells from selected network cells, wherein the localized cells provide at least one of the following:
        a locally tailored service;
        a special price or tariff for a call; and
        a special restriction on the mobile station's connectivity to the localized cells;
    transmitting information on said group of localized cells to the mobile station via a radio path; and
    controlling the operation of the mobile station on the basis of said group of localized cells.

2. The method of claim 1, wherein, in order to control the operation of the mobile station on the basis of said group of special cells,
    the information on special cells related to the mobile station in question is fetched from said group of special cells,
    information fetched on special cells is transmitted to the mobile station, and
    information on special cells is utilized in the mobile station.

3. The method of claim 2, wherein
    the information on special cells is stored in the memory of the mobile station, and
    a special cell is indicated in the mobile station on the basis of said information on special cells.

4. The method of claim 3, wherein in order to indicate a special cell in a mobile station,
    information on special cells is compared with the information on a current cell of the mobile station, and
    a user is informed of the mobile station being in a special cell, if the current cell is found in the information on special cells.

5. The method of claim 4, wherein to inform the user the mobile station provides a tone and/or information on the special cell is shown on the display of the mobile station.

6. The method of claim 5, wherein the information on special cells is transmitted to the mobile station in at least one of the following ways:
    a) as an Unstructured Supplementary Service Data message;
    b) in the location updating signaling; or
    c) as a short message.

7. The method of claim 5, wherein information on special cells is transmitted to the mobile station by storing it in a SIM card of the mobile station.

8. The method of claim 7, wherein connection of the mobile station to a network is either allowed or barred depending on whether or not said group of special cells correspondingly includes a cell to which the mobile station can connect.

9. The method of claim 8, wherein connection of the mobile station to a cell is either allowed or barred by correspondingly accepting or rejecting the request for location updating sent by the mobile station.

10. The method of claim 8, wherein the mobile station camps/does not camp on a cell on the basis of the information on special cells stored in the mobile station.

11. An arrangement for controlling local operation of a mobile station, said arrangement comprising means for processing location updating, wherein the arrangement further comprises:
    a group of localized cells formed for the mobile station, wherein the localized cells provide at least one of a locally tailored service, a special price or tariff for a call, or a special restriction on the mobile station's connectivity to the localized cells;
    means for processing said group of localized cells;
    means for transmitting information on said group of localized cells to the mobile station via a radio path; and
    means for controlling the operation of the mobile station on the basis of a list.

12. The arrangement of claim 11, wherein the means for processing said group of special cells comprise:
    means for fetching information on special cells, needed for the mobile station, from said group of special cells; and
    means for transmitting said information on special cells to the mobile station.

13. A database of a mobile communications system, wherein the database comprises a group of localized cells formed for a mobile station, wherein the localized cells provide at least one of a locally tailored service, a special price or tariff for a call, or a special restriction on the mobile station's connectivity to the localized cells.

14. The database of claim 13, wherein the group of special cells of the mobile station comprises a list of a subscriber's preferred cells.

15. The database of 14, wherein it is located either in a home location register of the mobile communication system or in an intelligent network.

16. The database of claim 14, wherein the database is located in the mobile station, preferably in its SIM card.

17. A mobile station, which is arranged to send a request for location updating, the mobile station comprising:
    first means for storing a group of localized cells, wherein the localized cells provide at least one of a locally tailored service, a special price or tariff for a call, or a special restriction on the mobile station's connectivity to the localized cells; and second means for utilizing the stored group of localized cells.

18. The mobile station of claim 17, wherein said second means comprise:
   means for comparing information on the group of special cells with information on a current cell of the mobile station; and
   means for informing a user of the information on special cells achieved as the result of the comparison.

19. The mobile station of claim 18, wherein the mobile station is arranged to give an audible and/or visual indication, when a cell of the mobile station changes in such a manner that at least either an old cell or a new cell is a special cell.

20. A location updating method, in which a mobile station sends a request for location updating to a network in order to update its location information, the request for location updating is transmitted to a visitor location register in order to update the location area of the mobile station, a message on location updating is sent from the visitor location register to a home location register in order to update the location information of the mobile station, location updating is carried out in the home location register, the home location register acknowledges completion of location updating to the visitor location register, and a message on completion of location updating is sent to the mobile station, wherein the method comprises sending a service request from the visitor location register in order to ask for information on special cells of the mobile station, and sending said information on special cells to the mobile station.

21. The location updating method of claim 20, wherein said service request is sent to an intelligent network.

22. The location updating method of claim 21 wherein the information on special cells is sent from the intelligent network to the visitor location register.

23. The location updating method of claim 22, wherein the information on special cells is sent from the visitor location register to the mobile station as a short message, an Unstructured Supplementary Service Data message, or as attached to the message on completion of location updating.

24. The location updating method of claim 21, wherein said service request is sent to the home location register.

25. The location updating method of claim 24, wherein the information on special cells is sent from the home location register to the mobile station as an Unstructured Supplementary Service Data message, or from the home location register to the visitor location register as attached to an acknowledgment message on completion of location updating, and from the visitor location register to the mobile station as attached to the message on completion of location updating.

26. The location updating method of claim 25, wherein the request for location updating is accepted or rejected depending on whether the location area indicated in the request for location updating contains cells that belong to said group of special cells.

27. A handover method from an old cell to a new cell, in which a mobile station sends measurement information to a first base transceiver station serving it, and the base transceiver station transmits said information to the base station controller after an optional post-processing, and on deciding to change a second base transceiver station to serve the mobile station, the base station controller sends a handover command to the mobile station through the first base transceiver station, wherein
   a group of special cells has been defined for the mobile station,
   if at least either the old cell or the new cell is a special cell, extra information on this is included in or directly associated with the handover command, and the extra information is used for controlling the operation of the mobile station, and
   the group of special cells is associated with an information element, which if in a certain state, indicates that at least part of the information on the group of special cells is to be transmitted to the base station controller at the beginning of a call.

28. The handover method of claim 27, wherein in response to said extra information the mobile station provides an audible and/or visual indication for its user.

29. The handover method of claim 28, wherein in response to said extra information the mobile station rejects the handover command.

30. The handover method of claim 27, wherein said extra information is divided into at least two types, and the mobile station rejects the handover command, if the extra information is of a certain type.

* * * * *